United States Patent [19]

Hattori et al.

[11] Patent Number: 5,319,058
[45] Date of Patent: Jun. 7, 1994

[54] METHOD FOR THE PREPARATION OF A POLYUREA RESIN

[75] Inventors: Masaaki Hattori; Chikara Hijikata, both of Shizuoka; Yuichiro Sato, Tokyo, all of Japan

[73] Assignee: Ihara Chemical Industry Co., Ltd., Tokyo, Japan

[21] Appl. No.: 963,992

[22] Filed: Oct. 20, 1992

[30] Foreign Application Priority Data

Oct. 22, 1991 [JP] Japan ................. 3-302534

[51] Int. Cl.$^5$ .......... C08G 18/32; C08G 18/66; C08G 18/50; C08G 18/79
[52] U.S. Cl. ................. 528/67; 528/68; 528/73; 528/75; 528/76; 528/79
[58] Field of Search ........ 528/67, 68, 73, 75, 528/76, 79

[56] References Cited

U.S. PATENT DOCUMENTS

| | | | |
|---|---|---|---|
| 3,929,863 | 12/1975 | Blahak et al. | 528/68 |
| 4,288,586 | 9/1981 | Bock et al. | 528/73 |
| 4,616,043 | 10/1986 | Smith | 528/73 |
| 4,788,262 | 11/1988 | Markusch et al. | 528/73 |
| 5,039,775 | 8/1991 | Oyaizu | 528/68 |
| 5,086,153 | 2/1992 | Oyaizu | 528/68 |

FOREIGN PATENT DOCUMENTS

| | | |
|---|---|---|
| 0032547 | 7/1981 | European Pat. Off. . |
| 0279376 | 8/1988 | European Pat. Off. . |
| 63-243122 | 10/1988 | Japan . |

OTHER PUBLICATIONS

Week 1192, Derwent Publication Ltd., London GB; AN 92-086147 & JP-A-04 031 417 (IHARA) 3 Feb. 1992 *abstract*.
Week 0789, Derwent Publications Ltd., London, GB; AN 89-051311 & JP-A-64 001 715 (Kinyosha) 6 Jan. 1989 *abstract*.

*Primary Examiner*—John Kigth, III
*Assistant Examiner*—Rabon Sergent
*Attorney, Agent, or Firm*—Wyatt, Gerber, Burke & Badie

[57] ABSTRACT

A polyurea resin having excellent mechanical properties along with high heat resistance can be prepared by the reaction of an aromatic polyamine component and an aliphatic polyisocyanate component, in which the aromatic polyamine component is a combination of a first aromatic polyamine compound which is typically a polyoxyalkylene bis(aminobenzoate) compound and a second aromatic polyamine compound selected from various classes of aromatic polyamine compounds different from the first aromatic polyamine compound in a specified weight proportion. The polyurea resin can be imparted with further improved heat resistance when the aliphatic polyisocyanate component is a combination of an aliphatic diisocyanate compound and a cyclic trimer of an aliphatic polyisocyanate compound in a specified weight proportion.

9 Claims, No Drawings

METHOD FOR THE PREPARATION OF A POLYUREA RESIN

BACKGROUND OF THE INVENTION

The present invention relates to a method for the preparation of a polyurea resin. More particularly, the invention relates to a method for the preparation of a polyurea resin having a high hardness and usefulness as a molding material of various kinds of rollers, e.g., calendering rollers, used in the industries of paper, fabrics, magnetic tapes and the like, casters and the like as well as excellent heat resistance by the reaction of a polyamine compound and a polyisocyanate compound.

As is disclosed in Japanese Patent Kokai 63-202612, a method is known for the preparation of a high-hardness polyurea resin having usefulness as a material of high-hardness rollers and the like, in which an aromatic polyamine compound such as a derivative of aminobenzoic acid and a polyisocyanate are reacted. This method, however, is not quite satisfactory because the hardness of the polyurea resin prepared by this method is not high enough for the purpose although the resin obtained by the method is excellent in respect of the impact strength and heat resistance.

Alternatively, a proposal is made in Japanese Patent Kokai 64-1715, according to which a polyurea resin is prepared by the reaction of an aromatic polyamine compound and a cyclic trimer of an aliphatic polyisocyanate compound. Although the resin obtained by this method has a sufficiently high hardness, the resin cannot be used in practical applications where high toughness of the resin is required because of the very poor impact strength of the resin.

Thus, no prior art method has been established by which a polyurea resin having a high hardness and excellent heat resistance and still having good impact strength suitable for practical applications can be easily prepared.

SUMMARY OF THE INVENTION

The present invention accordingly has an object to provide a novel method for the preparation of a polyurea resin having good toughness as a general-purpose molding resin and still having a high hardness of, for example, 80 to 90 in the Shore D scale and excellent heat resistance.

Thus, the method of the present invention for the preparation of a polyurea resin comprises the steps of (A) mixing (a) an aromatic polyamine component which is a combination of (a1) from 50 to 15% by weight of a first aromatic polyamine compound represented by the general formula

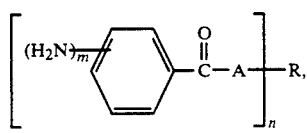

(I)

in which R is a residue of n valency of a polyalkylene, polyalkylenepolyether or polyalkylenepolyester having a molecular weight of at least 200 and containing or not containing an unsaturated linkage in the polyalkylene moiety, A is an oxygen atom or an imino group, the subscript m is an integer of 1 to 3 and the integer n is an integer of 2 to 4, and (a2) from 50 to 85% by weight of a second aromatic polyamine compound which is a compound selected from the group consisting of (a2-1) a diaminodiphenyl alkane compound, diaminodiphenyl ether compound or diaminodiphenyl sulfone compound represented by the general formula

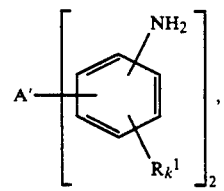

(II)

in which A' is an oxygen atom, lower alkylene group having 1 to 6 carbon atoms or sulfonyl group, $R^1$ is a hydrogen atom, halogen atom, halogen-substituted lower alkyl or lower alkoxycarbonyl group and the subscript k is an integer of 1 to 4 with the proviso, or a lower alkyl or lower alkoxycarbonyl group that, when k is 2 or larger, each $R^1$ is independent from the others, (a2-2) a bis(aminophenoxyphenyl) sulfone compound represented by the general formula

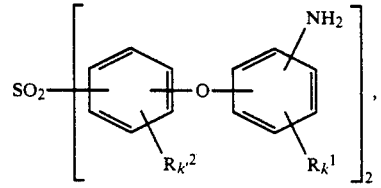

(III)

in which $R^1$ and k each have the same meaning as defined above, $R^2$ is a hydrogen atom, halogen atom, halogen-substituted lower alkyl or lower alkoxycarbonyl group, or a lower alkyl or lower alkoxycarbonyl group, and the subscript k' is an integer of 1 to 4 with the proviso that, when k' is 2 or larger, each $R^2$ is independent from the others, (a2-3) a bis(aminophenylthio) alkane compound or bis(aminophenylthioalkyl) phthalate compound represented by the general formula

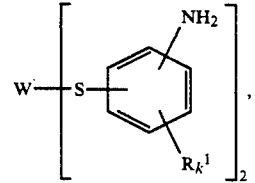

(IV)

in which $R^1$ and k each have the same meaning as defined above and W is a lower alkylene group or a divalent group represented by the general formula

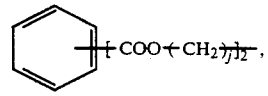

(V)

the subscript j being an integer of 1, 2 or 3, (a2-4) a polyalkylenepolyol bis(aminobenzoate) compound represented by the general formula

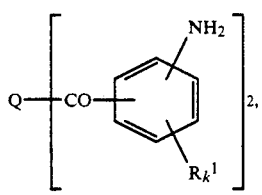

in which $R^1$ and k each have the same meaning as defined above and Q is a divalent group of the formula

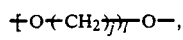

the subscripts j and l each being an integer of 1, 2 or 3, (a2-5) a diaminobenzoate ester compound represented by the general formula

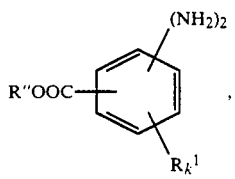

in which $R^1$ and k each have the same meaning as defined above and R" is an unsubstituted or substituted lower alkyl group, (a2-6) a diaminobenzophenone compound represented by the general formula

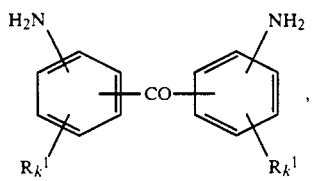

in which $R^1$ and k each have the same meaning as defined above, (a2-7) a phenylenediamine compound represented by the general formula

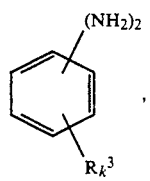

in which k has the same meaning as defined above and $R^3$ is a hydrogen atom, halogen atom, halogen-substituted or unsubstituted lower alkyl group, lower alkoxycarbonyl group, lower alkyl or lower alkoxycarbonyl group, or lower alkylthio group with the proviso that, when k is 2 or larger, each $R^3$ is independent from the others, (a2-8) a diaminodiphenyl propane compound represented by the general formula

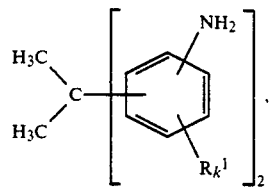

in which $R^1$ and k each have the same meaning as defined above, (a2-9) a tetraaminodiphenyl ether compound represented by the general formula

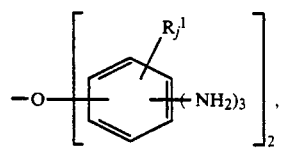

in which $R^1$ and j each have the same meaning as defined above, (a2-10) a tetraaminobiphenyl compound represented by the general formula

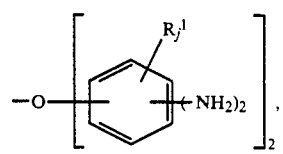

in which $R^1$ and j each have the same meaning as defined above, and (a2-11) a xylylenediamine compound represented by the general formula

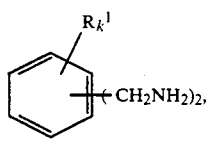

in which $R^1$ and k each have the same meaning as defined above, and (b) an aliphatic polyisocyanate component to give a mixture, and (B) heating the mixture to effect the reaction between the amino groups in the component (a) and the isocyanato groups in the component (b).

In particular, it is preferable that the polyisocyanate component (b) is a combination of (b1) an aliphatic diisocyanate compound and (b2) a cyclic trimer of an aliphatic polyisocyanate compound. The above mentioned diisocyanate compound is exemplified by 4,4'-dicyclohexylmethane diisocyanate, 1,3-bis-(isocyanatomethyl) cyclohexane, 3-isocyanatomethyl-3,5,5-trimethyl cyclohexyl isocyanate, hexamethylene-1,6-diisocyanate and α,α, α', α'-tetramethylxylylene diisocyanate.

DETAILED DESCRIPTION OF THE PREFERRED EMBODIMENTS

In view of the above described situations relative to the preparation of a high-hardness polyurea resin, the inventors have conducted extensive investigations to develop a method for the preparation of a high-hardness polyurea resin excellent in the mechanical properties and thermal characteristics as well as workability in molding by overcoming the problems in the prior art methods and, as a result, have arrived at a discovery that a polyurea resin as desired can be obtained by the reaction of (a) an aromatic polyamine component which is a combination of (a1) a first aromatic polyamine compound which is a derivative of aminobenzoic acid represented by the general formula (I) and (a2) a second aromatic polyamine compound represented by either one of the above defined polyamine compounds (a2-1) to (a2-11) in a specified weight proportion and (b) an aliphatic polyisocyanate component which is preferably a combination of (b1) an aliphatic diisocyanate compound and (b2) a cyclic trimer of an aliphatic polyisocyanate compound leading to completion of the present invention.

The first aromatic polyamine compound of the general formula (I) is a known compound and can be synthesized by the method disclosed in, for example, Japanese Patent Publications 60-32641 and 1-44733 and Japanese Patent Kokai 56-135514. Namely, the compound can be obtained by the reaction of a polyol compound or a polyol compound end-blocked with an amino group of the formula $(HA)_nR$, in which each symbol has the same meaning as defined before with an equimolar amount of an 2-, 3- or 4-nitrobenzoyl chloride or a di- or trinitrobenzoyl chloride in the presence of a hydrogen chloride acceptor to give a nitro compound which is subsequently reduced by a conventional procedure or by the reaction of a polyol compound or a polyol compound end-blocked with an amino group mentioned above with isatoic anhydride.

Alternatively, the first aromatic polyamine compound can be obtained also by the ester-exchange reaction between the above mentioned polyol compound and an alkyl ester of an aminobenzoic acid. In this reaction, the alkyl aminobenzoate can be replaced with a combination of an aminobenzoic acid and an aliphatic alcohol.

The first aromatic polyamine compound obtained by the above mentioned methods sometimes may have hydroxy groups at the molecular chain ends as a result of incomplete reaction but no particular adverse influences are caused by the use of such a reaction mixture as such without further purification provided that the content of the unreacted hydroxy groups is limited.

Examples of the above mentioned polyol compound as a starting reactant in the preparation of the first aromatic polyamine compound include aliphatic polyesterglycols such as polyethylene adipate, polypropylene adipate and the like obtained by the condensation reaction between an aliphatic glycol and a dicarboxylic acid to effect chain extension, polyalkyleneetherglycols obtained by the ring-opening polymerization of ethylene oxide, propylene oxide, tetrahydrofuran and the like, polyalkyleneetherglycols such as polypropyleneetherglycol, tetramethyleneetherglycol and the like, polyesterglycols obtained by the ring-opening polymerization of ε-caprolactam, polybutadienes hydroxylated at the molecular chain ends, copolymers of two kinds or more of alkylene oxides, copolymers of two kinds or more of glycols and a dicarboxylic acid, polyesterpolyols obtained by the copolymerization of a polyol such as a long-chain diol, e.g., mixture of aromatic glycols, glycerin, trimethylolpropane and the like with an aliphatic glycol and a dicarboxylic acid and polyetherpolyols obtained by the ring-opening polymerization of ethyleneoxide, propyleneoxide, tetrahydrofuran and the like with a polyol such as glycerin, trimethylolpropane and the like as a polymerization initiator as well as polyol compounds containing amino groups at the molecular chain ends introduced by the replacement of the terminal hydroxy groups therein with amino groups according to a known method.

Particular examples of the first aromatic polyamine compound of the general formula (I) include:
polyethyleneglycol bis(4-aminobenzoate);
polyethyleneglycol bis(2-aminobenzoate);
polyethyleneglycol bis(3-aminobenzoate);
polytetramethyleneglycol bis(4-aminobenzoate);
polytetramethyleneglycol bis(2-aminobenzoate);
polypropyleneglycol bis(4-aminobenzoate);
polypropyleneglycol bis(2-aminobenzoate);
poly(oxyethylene-oxypropylene)glycol bis(4-aminobenzoate);
polyoxybutyleneglycol bis(4-aminobenzoate);
polytetramethyleneglycol bis(3,5-diaminonenzoate);
polypropyleneetherglycerol tris(4-aminobenzoate);
polypropyleneetherpentaerithritol tetrakis(4-aminobenzoate);
polyoxyethylene bis(4-aminobenzamide);
polyoxypropylene bis(4-aminobenzamide);
polyoxypropylene bis(3,5-diaminobenzamide);
polyoxypropyleneetherglycerol tris(4-aminobenzamide);
and the like.

The second aromatic polyamine compound as the component (a2) can be any of the aromatic polyamine compounds (a2-1) to (a2-11) defined above. The benzene rings of these aromatic polyamine compounds may have one or more of the substituent groups such as halogen atoms, alkyl groups, trifluoromethyl groups, alkoxycarbonyl groups and the like.

In the general formulas representing these aromatic polyamine compounds of the second class (a2-1) to (a2-11), the lower alkylene group mentioned in the definitions can be a straightly linear or branched alkylene group having 1 to 6 carbon atoms. The halogen atom as the group $R^1$, $R^2$ or $R^3$ can be an atom of fluorine, chlorine, bromine or iodine. The lower alkyl or alkoxycarbonyl group as $R^1$, $R^2$ or $R^3$, which can be straightly linear or branched, has 1 to 6 carbon atoms and, when it is substituted by an atom of halogen, the halogen can be fluorine, chlorine, bromine or iodine. When $R^3$ is a lower alkylthio group, it can be a straightly linear or branched alkylthio group having 1 to 6 carbon atoms. The lower alkylene group as W is an alkylene group having 1 to 6 carbon atoms. Further, the lower alkyl as R", which can be straightly linear or branched, is also an alkyl group having 1 to 6 carbon atoms.

Particular examples of the second aromatic polyamine compound as the component (a2) include:
aromatic diamine compounds as a derivative of diphenylmethane such as 4,4'-methylene bisaniline, 4,4'-methylene bis(2-chloroaniline), 4,4'-methylene bis(2,3-dichloroaniline) (TCDAM), 4,4'-methylene bis(2,5-dichloroaniline), 4,4'-methylene bis(2-methylaniline), 4,4'-methylene bis(2-ethylaniline), 4,4'-methylene bis(2-isopropylaniline), 4,4'-methylene bis(2,6-dimethylaniline), 4,4'-methylene bis(2,6-diethylaniline), 4,4'-methylene bis(2-ethyl-6-methylaniline), 4,4'-methylene bis(2-chloro-6-methylaniline), 4,4'-methylene bis(2-chloro-6- ethylaniline), 4,4'-methylene bis(3-chloro-2,6-diethylaniline), 4,4'-methylene bis(2-trifluoromethylaniline), 4,4'-methylene bis(2-methyoxycarbonylaniline) and the like;

aromatic diamine compounds containing an atom of oxygen or sulfur in the molecule such as 4,4'-diaminodiphenyl ether, 4,4'-diamino-3,3'-dichlorodiphenyl ether, 4,4'-diaminodiphenyl sulfone, 4,4'-diamino-3,3'-dichlorodiphenyl sulfone, bis(4-aminophenoxyphenyl) sulfone, 1,2-bis(2-aminophenylthio) ethane, bis[2-(2-aminophenylthio) ethyl]terephthalate and the like;

aromatic diamine compounds as an ester of an aminobenzoic acid such as 1,3-propanediol bis(4-aminobenzoate), diethyleneglycol bis(4-aminobenzoate), triethyleneglycol bis(4-aminobenzoate), isopropyl 4-chloro-3,5-diaminobenzoate, isobutyl 4-chloro-3,5-diaminobenzoate and the like;

aromatic diamine compounds as a diaminotoluene such as 2,4-diaminotoluene, 2,6-diaminotoluene, 3,5-diethyl-2,4-diaminotoluene, 3,5-diethyl-2,6-diaminotoluene, 3,5-dimethylthio-2,4-diaminotoluene, 3,5-dimethylthio-2,6-diaminotoluene and the like;

aromatic diamine compounds of the diaminodiphenylpropane type such as 2,2-bis(4-aminophenyl) propane, 2,2-bis(4-amino-3-methylphenyl) propane, 2,2-bis(4-amino-3-isopropylphenyl) propane, 2,2-bis(4-amino-3,5-dimethylphenyl) propane, 2,2-bis(4-amino-3,5-diethylphenyl) propane, 2,2-bis(4-amino-3,5-diisopropylphenyl) propane, 2,2-bis(4-amino-3-ethyl-5-methylphenyl) propane and the like;

3,3'-diaminobenzophenone;

m- or p-phenylenediamine;

m- or p-xylylenediamine;

aromatic tetramine compounds such as 3,3',4,4'-tetraaminodiphenyl ether, 3,3',4,4'-tetraaminobiphenyl and the like; and so on. These aromatic polyamine compounds can be used either singly or as a combination of two kinds or more according to need.

As to the proportion of the first and the second aromatic polyamine compounds, it is preferable that the amount of the second aromatic polyamine compound is in the range from 50 to 85% by weight or, more preferably, from 50 to 80% by weight based on the total amount of the first and second polyamine compounds.

The aliphatic polyisocyanate component (b) to be reacted with the above described aromatic polyamine component (a) is preferably a combination of an aliphatic diisocyanate compound as the component (b1) and a cyclic trimer of an aliphatic polyisocyanate compound as the component (b2) in respect of the improved heat resistance of the polyurea resin. Examples of suitable aliphatic diisocyanate compounds include 4,4'-dicyclohexylmethane diisocyanate (H12MDI), 1,3-bis(isocyanatomethyl) cyclohexane (H6XDI), 3-isocyanatomethyl-3,5,5-trimethylcyclohexyl isocyanate (IPDI), hexamethylene-1,6-diisocyanate (HMDI), α,α,α',α'-tetramethylxylylene diisocyanate (TMXDI) and the like.

The cyclic trimer of an aliphatic polyisocyanate is a compound obtained by the trimerization reaction of an aliphatic polyisocyanate compound in the presence of a trimerization catalyst according to a known procedure. Examples of the aliphatic polyisocyanate compounds suitable for the trimerization reaction include 3-isocyanatomethyl-3,5,5-trimethylcyclohexyl isocyanate, hexamethylene-1,6-diisocyanate and the like.

The above mentioned catalyst for the trimerization reaction of an aliphatic polyisocyanate compound is exemplified by basic compounds including alkali metal salts of a carboxylic acid having 2 to 12 carbon atoms in a molecule such as potassium acetate, potassium propionate, potassium 2-ethylhexoate and sodium benzoate, alkali metal salts of a carboxylic acid having 13 or more carbon atoms in a molecule such as sodium oleate and potassium linolenate, alkali metal salts of a weak acid other than carboxylic acids such as sodium phenolate, strongly basic compounds including sodium methoxide, benzyl trimethyl ammonium hydroxide and alkali metal hydroxides, certain chelate compounds such as a chelate compound of salicylaldehyde and potassium as a typical example, carboxylic acid salts of a metal other than alkali metals such as calcium naphthenate, lead naphthenate and lead caprylate, tertiary amine compounds such as triethylamine, tripropylamine, tributylamine, N-methylmorpholine, N,N'-diethylpiperazine, 2,4,6-tris(dimethylaminomethyl) phenol and N,N',N''-tris(dialkylaminoalkyl) hexahydro-1,3,5-triazines and aziridinyl compounds disclosed in Japanese Patent Kokai 59-140218 as well as combinations of a tertiary amine and/or an aziridinyl compound with a cocatalyst such as phenols, epoxy compounds, alkyl carbonates and the like.

The above named aliphatic diisocyanate compounds and trimers of aliphatic polyisocyanate compounds can be used either singly or as a combination of two kinds or more in each class according to need. The polyurea resin can be imparted with higher heat resistance by using a combination of a diisocyanate compound and a cyclic trimer than by using a diisocyanate compound alone. The reaction mixture of the trimerization reaction of an aliphatic polyisocyanate compound as such can be used as the cyclic trimer component. When a cyclic trimer is used in combination with an aliphatic diisocyanate compound, it is preferable that the weight proportion of the cyclic trimer is in the range from 10 to 90% by weight or, more preferably, from 20 to 80% by weight based on the total amount of the diisocyanate compound and the cyclic trimer.

The proportion of the aromatic polyamine component and the aliphatic polyisocyanate component in the reaction according to the inventive method is selected such that the molar ratio of the isocyanato groups —NCO to the amino groups —NH$_2$ or, namely, the NCO index (—NCO/—NH$_2$), is in the range from 0.9 to 1.5 or, preferably, in the range from 1.0 to 1.2.

The reaction of the aromatic polyamine component and the aliphatic polyisocyanate component according to the method of the present invention is conducted typically by the following procedure.

In the first place, the first and the second aromatic polyamine compounds are mixed together in a specified proportion and heated to be melted together into a uniform liquid mixture which is thoroughly deaerated under a reduced pressure of 10 to 20 mmHg while keeping the liquid mixture at a temperature of 80° to 120° C. The liquid mixture of the aromatic polyamine compounds is then admixed with a specified amount of the aliphatic polyisocyanate component under agitation and the thus obtained mixture is, after deaeration, poured into a metal mold kept at a temperature of 60° to 120° C. and kept therein for a length of time of several tens of minutes to several hours at the same temperature so that the mixture is converted into a solidified form. The solidified form is removed from the metal mold and subjected to a post-curing treatment in an oven at 100° to 170° C. followed by aging at room temperature for about 1 week to give a polyurea resin.

It is optional that the mixture of the aromatic polyamine component and the aliphatic polyisocyanate component is admixed with a catalyst which preferably is soluble in the aromatic polyamine compounds. Examples of suitable catalysts include triethylenediamine, tertiary amine compounds such as triethylamine and 1,8-diazabicyclo-[5,4,0]-undecene-7, aziridinyl compounds and organometallic compounds.

The above mentioned organometallic compound as the catalyst is exemplified by Lewis acids, organotin compounds, acetylacetonato complexes of a metal, metal naphthenates, organomercury compounds, organolead compounds, basic metal salts such as organic borate esters, organoboron compounds, alkali metal salts of a carboxylic acid having 2 or more of carbon atoms in a molecule, basic compounds such as alkali metal salts of a weak acid other than carboxylic acids, e.g., sodium phenolate, strong basic compounds such as sodium methoxide and alkali metal hydroxides and chelate compounds of a metal such as a chelate compound of salicylaldehyde and potassium. Phenols, epoxide compounds and alkyl carbonates can also be used as a cocatalyst.

The amount of the above described catalyst, when used, is usually in the range from 0.01 to 5 parts by weight or, preferably, from 0.05 to 3 parts by weight per 100 parts by weight of the total amount of the first and the second aromatic polyamine compounds.

It is optional in the method of the present invention when an increase in the curing velocity is desired that the mixture of the aromatic polyamine component and the aliphatic polyisocyanate component is further admixed with an aromatic isocyanate compound such as 4,4'-diphenylmethane diisocyanate (MDI) and the like in an amount of 5 to 15 parts by weight per 100 parts by weight of the polyisocyanate component.

It is of course optional that the reaction mixture according to the method of the invention is further admixed with various kinds of known additives depending on the particular intended application of the polyurea resin including antioxidants, ultraviolet absorbers, coloring inhibitors, hydrolysis inhibitors, antifungal agents, flame retardants, coloring agents, extenders, fillers and the like.

When a polyurea resin is prepared according to the inventive method, in which the reaction is effected between a combination of the first and the second aromatic polyamine compounds and a combination of the aliphatic diisocyanate compound and the cyclic trimer of an aliphatic polyisocyanate compound, the resin has excellent properties including sufficiently high elongation and toughness and a high hardness of Shore D 80 to 90 along with excellent heat resistance. The polyurea resin obtained by the inventive method has excellent workability in molding and is suitable for integral molding with an iron core of a resin roller, which is considered difficult with conventional resins for rollers, by the casting method as with conventional urethane resins.

In the following, the method of the present invention is illustrated in more detail by way of examples and comparative examples as preceded by the description of the procedure for the synthetic preparation of the first aromatic polyamine compounds. In the following description, the term of "parts" always refers to "parts by weight".

PREPARATION 1

Into a four-necked flask of 5-liters capacity equipped with a thermometer, reflux condenser, dropping funnel and stirrer were introduced 970 g (1.0 mole) of a polytetramethyleneglycol having an average molecular weight of 970, 242.5 g (2.4 moles) of triethylamine and 1000 ml of toluene to form a mixture. This mixture was heated at 40° to 50° C. under agitation and a solution prepared separately by dissolving 371 g (2.0 moles) of 4-nitrobenzoyl chloride in 1000 ml of toluene was added thereto dropwise over a period of 2 hours. After completion of the dropwise addition of the solution, the mixture in the flask was heated under reflux for 1.5 hours to complete the reaction. The reaction mixture after spontaneous cooling to room temperature was filtered to remove the triethylamine hydrochloride as the precipitates and the filtrate was concentrated by evaporation of the solvent to give 1217.5 g of a yellow liquid which was a dinitro compound as the intermediate. The yield of this intermediate product was 96.0% of the theoretical value.

Into a four-necked flask of 10-liters capacity equipped with a thermometer, reflux condenser, dropping funnel and stirrer were introduced 614 g (11.0 moles) of iron powder, 30 g of acetic acid as a catalyst, 2500 ml of toluene and 1000 ml of water to give a mixture. A solution prepared by dissolving 1217.5 g of the above obtained dinitro compound as the intermediate in 1000 ml of toluene was added dropwise into the mixture in the flask under reflux taking 1.5 hours. After completion of the dropwise addition of the solution, the reaction mixture in the flask was agitated for 5 hours at the same temperature to complete the reaction. The thus obtained reaction mixture was admixed with sodium hydrogen-carbonate to neutralize the acetic acid and filtered, while it was still hot, to remove the iron sludge. The filtrate was further subjected to phase separation to remove the aqueous phase. The organic solution obtained here was freed from toluene by distillation to give 1057.5 g of a clear and red viscous liquid as the product which could be identified to be polytetramethyleneglycol bis(4-aminobenzoate) as desired. The yield of this product was 90.9% of the theoretical value. The amine value and the hydroxyl value of this polyamine compound were 88.9 mg KOH/g and 2.5 mg KOH/g, respectively.

PREPARATION 2

Into a four-necked flask of 1-liter capacity equipped with a thermometer, reflux condenser, water-separating tube and stirrer were introduced 194 g (0.2 mole) of the same polytetramethyleneglycol as used in Preparation 1, 65.9 g (0.4 mole) of ethyl 4-aminobenzoate and 0.018 g of tetrabutyl titanate to give a mixture, which was heated at 200° C. with agitation under a stream of nitrogen gas so that ethyl alcohol was discharged as a distillate in an amount of 82% based on the theoretical amount. The temperature of the reaction mixture in the flask was further increased to 215° C. and the mixture was agitated for 2 hours at this temperature to complete the reaction followed by removal of the unreacted ethyl 4-aminobenzoate by distillation under reduced pressure to give 234.3 g of a reddish brown viscous liquid which could be identified as the desired product of polytetramethyleneglycol bis(4-aminobenzoate). The yield of this product was 97.0% of the theoretical value. The amine value and the hydroxyl value of this polyamine compound were 81.4 mg KOH/g and 14.5 mg KOH/g, respectively.

EXAMPLE 1

A mixture composed of 40 parts of the aromatic polyamine compound prepared in Preparation 1 described above and 60 parts of 4,4'-methylenebis(2-chloroaniline) was melted by heating followed by deaeration and kept in an oven at 80° C. The melt was admixed with a liquid isocyanate mixture composed of 49.3 parts of H12MDI and 32.9 parts of a cyclic trimer of hexamethylene-1,6-diisocyanate, of which the content of the —NCO group was 21% by weight (Duranate THA-100, a product by Asahi Chemical Co.) in such an amount that the NCO index, i.e. molar ratio of —NCO/—NH$_2$, was 1.05. The mixture after deaeration was poured into a casting mold preheated at 100° C. and kept there for 1 hour at the same temperature so that the liquid mixture was converted into a solid form which was removed from the mold. The thus obtained solid form was subjected to a post-curing treatment in an air-circulation oven at 120° C. for 4 hours followed by aging at room temperature for 1 week to give a polyurea resin, of which mechanical properties were measured to give the results shown in Table 1. The measurement for the tensile tests was undertaken according to the procedure specified in JIS K 6301 but at a pulling velocity of 50 mm/minute. The glass transition point Tg given in the table is a value calculated by the method described in Japanese Patent Kokai 63-202612.

EXAMPLE 2

The experimental procedure was substantially the same as in Example 1 excepting replacement of the aromatic polyamine compound obtained in Preparation 1 with the same amount of the aromatic polyamine compound obtained in Preparation 2. The mechanical properties of the thus obtained polyurea resin are shown also in Table 1.

EXAMPLE 3

The experimental procedure was about the same as in Example 1 except that the aromatic polyamine component was a combination of 20 parts of the polyamine compound prepared in Preparation 1 and 80 parts of 4,4'-methylenebis(2-chloroaniline) and the aliphatic polyisocyanate component was a combination of 33.4 parts of 4,4'-dicyclohexylmethane diisocyanate and 78.0 parts of the same cyclic polyisocyanate trimer as used in Example 1. The mechanical properties of the thus obtained polyurea resin are shown also in Table 1.

EXAMPLE 4

The experimental procedure was about the same as in Example 1 except that the aromatic polyamine component, which was kept at 100° C. instead of 80° C., was a combination of 40 parts of the polyamine compound prepared in Preparation 1 and 60 parts of 4,4'-methylenebis(2,3-dichloroaniline) and the aliphatic polyisocyanate component was a combination of 39.8 parts of 4,4'-dicyclohexylmethane diisocyanate and 26.5 parts of the same cyclic polyisocyanate trimer as used in Example 1. The mechanical properties of the thus obtained polyurea resin are shown also in Table 1.

EXAMPLE 5

The experimental procedure was about the same as in Example 1 except that the aromatic polyamine component was a combination of 40 parts of the polyamine compound prepared in Preparation 1 and 60 parts of 4,4'-methylenebis(2-chloroaniline) and the aliphatic polyisocyanate component was a combination of 46.5 parts of 1,3-bis(isocyanatomethyl) cyclohexane and 11.6 parts of the same cyclic polyisocyanate trimer as used in Example 1. The mechanical properties of the thus obtained polyurea resin are shown also in Table 1.

EXAMPLE 6

The experimental procedure was about the same as in Example 1 except that the aromatic polyamine component was a combination of 40 parts of the polyamine compound prepared in Preparation 1 and 60 parts of 4,4'-methylenebis(2-chloroaniline) and the aliphatic polyisocyanate component was a combination of 43.1 parts of 3-isocyanatomethyl-3,5,5-trimethylcyclohexyl isocyanate and 28.8 parts of the same cyclic polyisocyanate trimer as used in Example 1. The mechanical properties of the thus obtained polyurea resin are shown also in Table 1.

COMPARATIVE EXAMPLE 1

A polyurea resin was prepared by admixing 63.6 parts of molten 4,4'-methylenebis(2-chloroaniline) at 100° C. with 100 parts of the same cyclic polyisocyanate trimer as used in Example 1 kept at 50° C. The mechanical properties of the thus obtained polyurea resin are shown also in Table 1.

COMPARATIVE EXAMPLE 2

A polyurea resin was prepared in the same manner as in Comparative Example 1 excepting replacement of the 63.6 parts of molten 4,4'-methylenebis(2-chloroaniline) with a combination of 62.1 parts of 4,4'-methylenebis(2-chloroaniline) and 6.9 parts of the polytetramethyleneglycol 4-aminobenzoate prepared in Preparation 1. The mechanical properties of the thus obtained polyurea resin are shown also in Table 1.

COMPARATIVE EXAMPLE 3

A mixture composed of 70 parts of the polyamine compound obtained in Preparation 1 and 30 parts of 4,4'-methylenebis(2-chloroaniline) was melted together and deaerated followed by cooling to room temperature. This mixture of aromatic polyamine compounds was admixed with 51.3 parts of liquid MDI with agitation and converted in the same manner as in Example 1 into a polyurea resin. The mechanical properties of the thus obtained polyurea resin are shown also in Table 1.

EXAMPLE 7

The experimental procedure was about the same as in Example 1 except that the aliphatic polyisocyanate component was a combination of 53.0 parts of 4,4'-dicyclohexylmethane diisocyanate, 21.8 parts of the same cyclic polyisocyanate trimer as used in Example 1 and 31.8 parts of a cyclic trimer of 3-isocyanatomethyl-3,5,5-trimethylcyclohexyl isocyanate and the temperature of the post-curing in an oven was 170° C. instead of 120° C. The mechanical properties of the thus obtained polyurea resin are shown also in Table 1.

EXAMPLE 8

The experimental procedure was about the same as in Example 1 except that the aromatic polyamine component was a combination of 20 parts of the polyamine compound prepared in Preparation 1 and 80 parts of

| | Example | | | | | | | | | | | Comparative Example | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Hardness, Shore D | 86 | 86 | 88 | 83 | 85 | 86 | 86 | 89 | 90 | 89 | 89 | 86 | 82 | 78 |
| Tensile strength, kg/cm$^2$ | 848 | 802 | 890 | 689 | 827 | 813 | 811 | 623 | 656 | 642 | 601 | 485 | 408 | 586 |
| Elongation at break, % | 24 | 26 | 19 | 39 | 25 | 24 | 21 | 14 | 15 | 14 | 11 | 8 | 11 | 165 |
| Izod impact strength, notched kg · cm/cm$^2$ | 8.6 | 8.9 | 7.2 | 13.8 | 12.3 | 7.8 | | | | | | 3.8 | 4.9 | 18.8 |
| Glass transition point Tg, °C | 189 | | | | | | 213 | 223 | 215 | 220 | 209 | 171 | | | of 4,4'-dicyclohexylmethane diisocyanate, 21.0 parts of the same cyclic polyisocyanate trimer as used in Example 1 and 31.5 parts of a cyclic trimer of 3-isocyanatomethyl-3,5,5-trimethylcyclohexyl isocyanate and the temperature of the post-curing was 170° C. instead of 120° C. The mechanical properties of the thus obtained polyurea resin are shown also in Table 1.

EXAMPLE 9

The experimental procedure was about the same as in Example 1 except that the aromatic polyamine component was a combination of 20 parts of the polyamine compound prepared in Preparation 1 and 80 parts of 4,4'-methylenebis(2-chloroaniline), the aliphatic polyisocyanate component was a combination of 26.0 parts of α,α,α',α'-tetramethylxylylene diisocyanate, 26.0 parts of the same cyclic polyisocyanate trimer as used in Example 1 and 78.0 parts of a cyclic trimer of 3-isocyanatomethyl-3,5,5-trimethylcyclohexyl isocyanate and the temperature of post-curing was 170° C. instead of 120° C. The mechanical properties of the thus obtained polyurea resin are shown also in Table 1.

EXAMPLE 10

The experimental procedure was about the same as in Example 1 except that the aromatic polyamine component was a combination of 20 parts of the polyamine compound prepared in Preparation 1 and 80 parts of 4,4'-methylenebis(2-chloroaniline), the aliphatic polyisocyanate component was a combination of 34.7 parts of 4,4'-dicyclohexylmethane diisocyanate, 11.6 parts of α,α,α',α'-tetramethylxylylene diisocyanate, 23.2 parts of the same cyclic polyisocyanate trimer as used in Example 1 and 46.3 parts of a cyclic trimer of 3-isocyanatomethyl-3,5,5-trimethylcyclohexyl isocyanate and the temperature of post-curing was 170° C. The mechanical properties of the thus obtained polyurea resin are shown also Table 1.

EXAMPLE 11

The experimental procedure was about the same as in Example 1 except that the aromatic polyamine component was a combination of 20 parts of the polyamine compound prepared in Preparation 1 and 80 parts of a 8:2 mixture of 2,4- and 2,6-diamino-3,5-dimethylthiotoluenes, the aliphatic polyisocyanate component was a combination of 71.1 parts of 4,4'-dicyclohexylmethane diisocyanate and 47.4 parts of a cyclic trimer of hexamethylene diisocyanate and the temperature of post-curing was 170° C. The mechanical properties of the thus obtained polyurea resin are shown also in Table 1.

What is claimed is:

1. A method for the preparation of a polyurea resin which comprises the steps of (A) mixing:
   (a) an aromatic polyamine component which is a combination of
   (a1) from 50 to 15% by weight of a first aromatic polyamine compound represented by the general formula

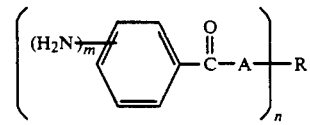

in which R is a residue of a valency of a polyalkylene, polyalkylenepolyether or polyalkylenepolyester having a molecular weight of at least 200 and containing or free from an unsaturated linkage in the polyalkylene moiety, A is an oxygen atom or an imino group, the subscript m is an integer of 1 to 3 and the integer n is an integer of 2 to 4, and
   (a2) from 50 to 85% by weight of a second aromatic polyamine compound which is a compound selected from the group consisting of
   (a2-1) a diaminodiphenyl alkane compound, diaminodiphenyl ether compound or diaminodiphenyl sulfone compound represented by the general formula

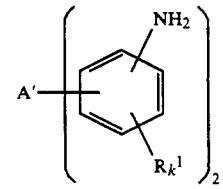

in which A' is an oxygen atom, lower alkylene group having 1 to 6 carbon atoms or sulfonyl group, R$^1$ is a hydrogen atom, halogen atom, halogen-substituted lower alkyl or lower alkoxycarbonyl group, or a lower alkyl or alkoxycarbonyl group, and the subscript k is an integer of 1 to 4 with the proviso that, when k is 2 or larger, each R$^1$ is independent from the others,
   (a2-2) a bis(aminophenoxyphenyl) sulfone compound represented by the general formula

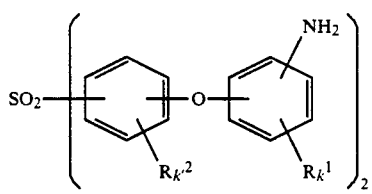

in which $R^1$ and k each have the same meaning as defined above, $R^2$ is a hydrogen atom, halogen atom, halogen-substituted lower alkyl or lower alkoxycarbonyl group, lower alkyl or lower alkoxycarbonyl group, and the subscript k' is an integer of 1 to 4 with the proviso that, when k' is 2 or larger, each $R^2$ is independent from the others, (a2-3) a bis(aminophenylthio) alkane compound or bis(aminophenylthioalkyl) phthalate compound represented by the general formula

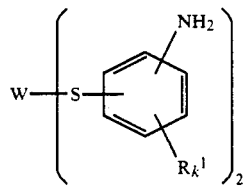

in which $R^1$ and k each have the same meaning as defined above and W os a lower alkylene group or a divalent group represented by the general formula

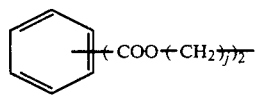

the subscript j being an integer of 1, 2 or 3, (a2-4) a polyalkylenepolyol bis(aminobenzoate) compound represented by the general formula

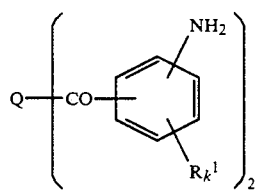

in which $R^1$ and l each have the same meaning as defined above and Q is a equivalent group of the formula

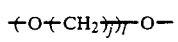

the subscripts j and l each being an integer of 1, 2 or 3, (a2-5) a diaminobenzoate ester compound represented by the general formula

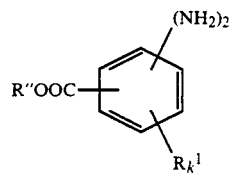

in which $R^1$ and k each have the same meaning as defined above and R" is an unsubstituted or substituted lower alkyl group, (a2-6) a diaminobenzophenone compound represented by the general formula

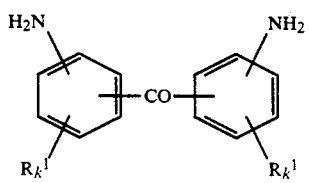

in which $R^1$ and k each have the same meeting as defined above, (a2-7) a phenylenediamine compound represented by the general formula

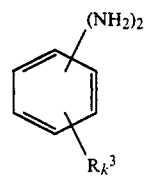

in which k has the same meaning as defined above and $R^3$ is a hydrogen atom, halogen atom, or halogen-substituted lower alkyl or lower alkoxy carbonyl group, lower alkyl or lower alkoxycarbonyl group, or lower alkylthio group with the proviso that, when k is 2 or larger, each $R^3$ is independent from the others, (a2-8) a diaminodiphenyl propane compound represented by the general formula

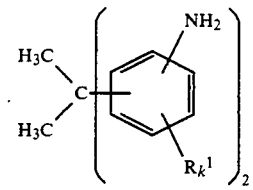

in which $R^1$ and k each have the same meaning as defined above, (a2-9) a tetraaminodiphenyl ether compound represented by the general formula

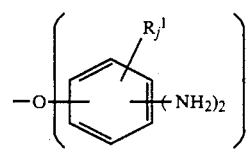

in which R¹ and j each have the same meaning as defined above, (a2-10) a tetraaminobiphenyl compound represented by the general formula

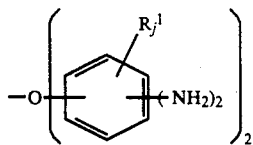

in which R¹ and j each have the same meaning as defined above, and (a2-11) a xylylenediamine compound represented by the general formula

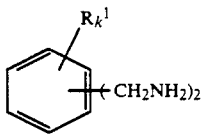

in which R¹ and k each have the same meaning as defined above, and (b) an aliphatic polyisocyanate component, which is a combination of (b1) from 10 to 90% by weight of an aliphatic diisocyanate compound and (b2) from 90 to 10% by weight of a cyclic trimer of an aliphatic polyisocyanate compound, to give a mixture, and (B) heating the mixture to effect the reaction between the amino groups in the component (a) and the isocyanato groups in the component (b).

2. The method for the preparation of a polyurea resin as claimed in claim 1 in which the polyisocyanate component (b) is a combination of (b1) from 20 to 80% by weight of an aliphatic diisocyanate compound and (b2) from 80 to 20% by weight of a cyclic trimer of an aliphatic polyisocyanate compound.

3. The method for the preparation of a polyurea resin as claimed in claim 2 in which the diisocyanate compound as the component (b1) is selected from the group consisting of 4,4'-dicyclohexylmethane diisocyanate, 1,3-bis(isocyanatomethyl) cyclohexane, 3-isocyanatomethyl-3,5,5-trimethyl cyclohexyl isocyanate, hexamethylene-1,6-diisocyanate and α,α,α',α'-tetramethylxylylene diisocyante.

4. The method for the preparation of a polyurea resin as claimed in claim 1 in which the aromatic polyamine component (a) and the aliphatic polyisocyante component (b) are mixed in such a proportion that the molar ratio of the isocyanato groups in the component (b) to the amino groups in the component (a) is in the range from 0.9 to 1.5.

5. The method for the preparation of a polyurea resin as claimed in claim 2 in which the cyclic trimer of an aliphatic polyisocyanate compound as the component (b2) is a cyclic trimer of 3-isocyanatomethyl-3,5,5-trimethylcyclohexyl isocyanate or hexamethylene-1,6-diisocyanate.

6. The method for the preparation of a polyurea resin as claimed in claim 1 in which the group denoted by A in the general formula representing the first aromatic polyamine compound is an oxygen atom.

7. The method for the preparation of a polyurea resin as claimed in claim 1 in which the subscript n in the general formula representing the first aromatic polyamine compound is 2.

8. The method for the preparation of a polyurea resin as claimed in claim 1 in which the second aromatic polyamine compound is a diaminodiphenyl alkane compound, diaminodiphenyl ether compound or diaminodiphenyl sulfone compound of the a2-1 group.

9. The method for the preparation of a polyurea resin as claimed in claim 1 in which the second aromatic polyamine compound is a polyalkylenepolyol bis(aminobenzoate) compound of the a2-4 group.

* * * * *

UNITED STATES PATENT AND TRADEMARK OFFICE
CERTIFICATE OF CORRECTION

PATENT NO. : 5,319,058
DATED : June 7, 1994
INVENTOR(S) : Masaaki Hattori, Chikara Hijikata & Yuichiro Sato It is certified that error appears in the above-identified patent and that said Letters Patent is hereby corrected as shown below:

Column 2, in the formula II, "$R_k^1$" should read --$R^1_k$--.

Column 2, line 19 to line 25,"in which A' is an oxygen atom, lower alkylene group having 1 to 6 carbon atoms or sulfonyl group, $R^1$ is a hydrogen atom, halogen atom, halogen-substituted lower alkyl or lower alkoxycarbonyl group and the subscript k is an integer of 1 to 4 with the proviso, or a lower alkyl or lower alkoxycarbonyl group that, when k is 2 or larger, each $R^1$ is independent from the others,"
should read --in which A' is an oxygen atom, lower alkylene group having 1 to 6 carbon atoms or sulfonyl group, $R^1$ is a hydrogen atom, halogen atom, halogen-substituted lower alkyl or lower alkoxycarbonyl group, or a lower alkyl or lower alkoxycarbonyl group, and the subscript k is an integer of 1 to 4 with the proviso that, when k is 2 or larger, each $R^1$ is independent from the others,--.

Column 2, in the formula III, "$R_k^1$" and "$R_{k'}^2$" should read --$R^1_k$-- and --$R^2_{k'}$--, respectively.

Column 2, in the formula IV, "$R_k^1$" should read --$R^1_k$--.

Column 3, the formula VI should read as follows by correcting "$R_k^1$" to --$R^1_k$-- and moving the subscript 2 to the bottom of the square brackets.

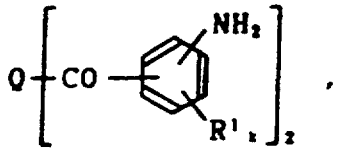

UNITED STATES PATENT AND TRADEMARK OFFICE
CERTIFICATE OF CORRECTION

PATENT NO. : 5,319,058
DATED : June 7, 1994
INVENTOR(S) : Masaaki Hattori, Chikara Hijikata & Yuichiro Sato It is certified that error appears in the above-indentified patent and that said Letters Patent is hereby corrected as shown below:

Column 3, the formula VII should read as follows by correcting ")", second occurrence, to --]--.

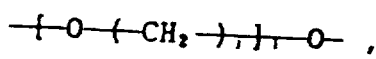

Column 3, in the formula VIII, "$R_k^1$" should read --$R^1_k$--.

Column 3, in the formula IX, each of two "$R_k^1$" should read --$R^1_k$--.

Column 3, in the formula X, "$R_k^3$" should read --$R^3_k$--.

Column 3, line 2 from the bottom, start a new line with (a2-8).

Column 4, in the formula XI, "$R_k^1$" should read --$R^1_k$--.

Column 4, the formula XII should read as follows by correcting "$R_j^1$" to --$R^1_j$-- and the subscript "3" of ($NH_2$) to --2--.

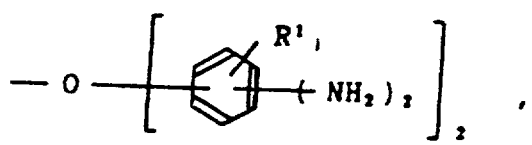

UNITED STATES PATENT AND TRADEMARK OFFICE
CERTIFICATE OF CORRECTION

PATENT NO. : 5,319,058
DATED : June 7, 1994
INVENTOR(S) : Masaaki Hattori, Chikara Hijikata & Yuichiro Sato It is certified that error appears in the above-identified patent and that said Letters Patent is hereby corrected as shown below:

Column 4, the formula XIII should read as follows by correcting "$R_j{}^1$" to --$R^1{}_j$-- and deleting "O (oxygen)".

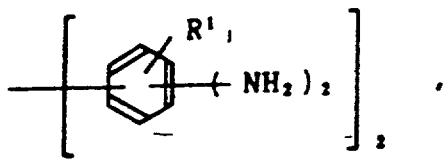

Column 4, in the formula XIV, "$R_k{}^1$" should read --$R^1{}_k$--.

Column 7, line 3, "bis(2-methyoxycarbonylaniline)" should read --bis(2-methoxycarbonylaniline)--.

Column 7, line, 26, after propane, second occurrence, add --2,2-bis(4-amino-3-ethylphenyl) propane--.

Column 14, in (a1) of claim 1, line 1 below the formula, "$\underline{a}$ valency" should read --$\underline{n}$ valency--.

Column 14, in the formula in (a2-1) of claim 1, "$R_k{}^1$" should read --$R^1{}_k$--.

Column 15, in the formula in (a2-2) of claim 1, "$R_k{}^1$" and "$R_{k'}{}^2$" should read --$R^1{}_k$-- and --$R^2{}_{k'}$--, respectively.

Column 15, in the first formula in (a2-3) of claim 1, "$R_k{}^1$" should read --$R^1{}_k$--.

Column 15, in (a2-3) of claim 1, line 2 below the first formula, "os" should read --is--.

UNITED STATES PATENT AND TRADEMARK OFFICE
CERTIFICATE OF CORRECTION

PATENT NO. : 5,319,058

DATED : June 7, 1994

INVENTOR(S) : Masaaki Hattori, Chikara Hijikata & Yuichiro Sato

It is certified that error appears in the above-indentified patent and that said Letters Patent is hereby corrected as shown below:

Column 15, the second formula in (a2-3) of claim 1 should read as follows by correcting brackets "(", first occurrence, and ")", second occurrence, to square brackets --[-- and --]--, respectively.

Column 15, in the first formula in (a2-4) of claim 1, "$R_k{}^1$" should read --$R^1{}_k$--.

Column 15, in (a2-4) of claim 1, line 1 below the first formula, "1" should read --k--.

Column 15, in (a2-4) of claim 1, line 2 below the general formula, "equivalent" should read --divalent--.

Column 15, the second formula in (a2-4) of claim 1 should read as follows by correcting brackets "(", first occurrence, and ")", second occurrence, to square brackets --[-- and --]--, respectively.

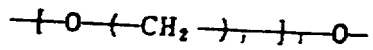

Column 15, line 8 from the bottom, "$R^1$ and 1" should read --$R^1$ and $\underline{k}$--.

UNITED STATES PATENT AND TRADEMARK OFFICE
CERTIFICATE OF CORRECTION

PATENT NO. : 5,319,058
DATED : June 7, 1994
INVENTOR(S) : Masaaki Hattori, Chikara Hijikata & Yuichiro Sato It is certified that error appears in the above-identified patent and that said Letters Patent is hereby corrected as shown below:

Column 16, in the formula in (a2-5) of claim 1, "$R_k{}^1$" should read --$R^1{}_k$--.

Column 16, in the formula in (a2-6) of claim 1, "$R_k{}^1$" should read --$R^1{}_k$--.

Column 16, in the formula in (a2-7) of claim 1, "$R_k{}^3$" should read --$R^3{}_k$--.

Column 16, in (a2-7) of claim 1, line 2 below the formula, delete "or".

Column 16, in (a2-7) of claim 1, line 4 below the formula, before "lower alkyl" add --a--.

Column 16, in the formula in (a2-8) of claim 1, "$R_k{}^1$" should read --$R^1{}_k$--.

Column 16, in the formula in (a2-9) of claim 1, "$R_j{}^1$" should read --$R^1{}_j$--.

Column 17, the formula in (a2-10) of claim 1 should read as follows by correcting "$R_j{}^1$" to --$R^1{}_j$-- and deleting "O(oxygen)".

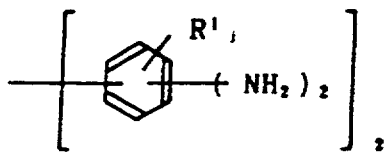

UNITED STATES PATENT AND TRADEMARK OFFICE
CERTIFICATE OF CORRECTION

PATENT NO. : 5,319,058
DATED : June 7, 1994
INVENTOR(S) : Masaaki Hattori, Chikara Hijikata & Yuichiro Sato It is certified that error appears in the above-identified patent and that said Letters Patent is hereby corrected as shown below:

Column 17, in the formula in (a2-11) of claim 1, "$R_k^1$" should read --$R^1_k$--.

Column 14, in (a1) of claim 1, line 7 below the formula, "integer n" should read --subscript n--.

Signed and Sealed this

Twentieth Day of June, 1995

Attest:

BRUCE LEHMAN

Attesting Officer

Commissioner of Patents and Trademarks